May 19, 1959     W. HERMAN ET AL     2,886,853
PROCESS FOR THE PRODUCTION OF HOLLOW OBJECTS
Filed Dec. 30, 1954
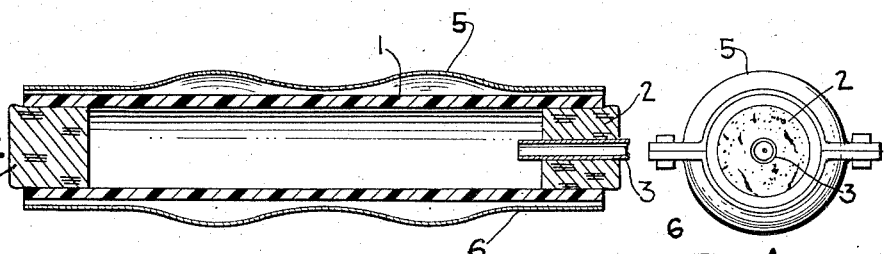
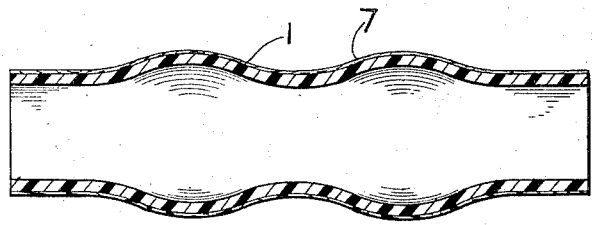
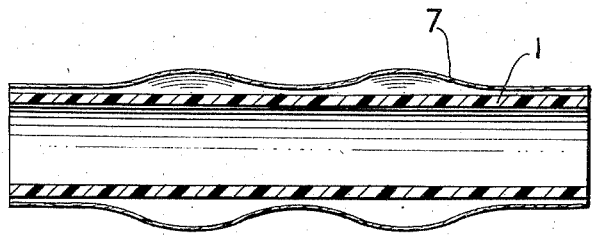
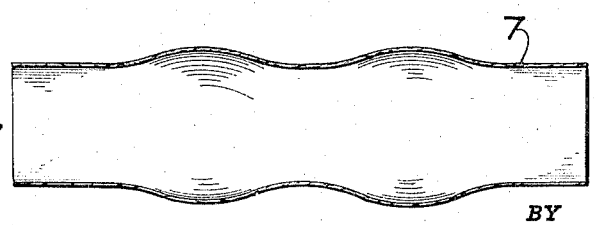
*INVENTORS*
Wilhelm Herman
BY Baldeüs van Rooyen
*ATTORNEYS*

United States Patent Office 2,886,853
Patented May 19, 1959

2,886,853
PROCESS FOR THE PRODUCTION OF
HOLLOW OBJECTS

Wilhelm Herman and Baldeüs van Rooyen, Delft, Netherlands, assignors to Nederlandse Organisatie voor Toegepast-Natuurwetenschappelijk Onderzoek Ten Behoeve Van Nijverheid, Handel en Verkeer, The Hague, Netherlands, a corporation of the Netherlands Application December 30, 1954, Serial No. 478,902
Claims priority, application Netherlands January 5, 1954
6 Claims. (Cl. 18—55)

The invention relates to the production of hollow objects consisting of thermosetting resinous material which may be provided with internal reinforcements such as fiber material or cloth.

A known process for the production of polyester glass fiber tubes consists of the wrapping of glass fiber or glass tissue around a steel mandrel and impregnating this glass fiber material with a liquid mixture of an unsaturated polyester and an unsaturated co-polymerizable compound such as, for instance, styrene, which mixture cures; after curing, the steel core is removed by knocking it out of the tube formed. The removal of the steel from the tube formed is, however, difficult, elaborate and time-consuming.

Another known process for the production of hollow objects in which a mold is used consists in using a rubber core which can be blown up during the forming operation and then collapsed and removed from the formed thermoplastic molded object. A process is also known according to which a mold consisting of an elastic, hollow form which can be expanded mechanically is used. However, in these processes the form stability of the final molded object leaves much to be desired.

The production of tubes from a curing mass and a fabric reinforcement on a mandrel consisting of a helical spring of steel wire or ribbon as a mandrel or core is also known. A drawback to this process is, however, that it is very difficult to produce tubes with a smooth inner surface because of the irregularities in the mandrel.

It is the object of this invention to avoid these drawbacks and to provide a process for the production of hollow objects with smooth inner surfaces, of an exactly predetermined shape.

Another object of this invention is to utilize mandrels, cores or forms for the molding of hollow objects which can be given a predetermined and exact size and shape for the molding operation and thereafter can be shrunk to a different size for removal from the formed or molded object.

Another object of the invention is to use a material with an elastic memory to form a core, mandrel or form for use in molding thermosetting resinous materials.

Various other objects and advantages of this invention will appear from the following exemplary description.

In the drawings,

Fig. 1 is a longitudinal view of the unexpanded thermoplastic form or mandrel,

Fig. 2 is a longitudinal view of the unexpanded thermoplastic form or mandrel of Fig. 1 inserted in a metal tube or die having the desired final shape of the molded hollow article, Fig. 3 is a cross-sectional view of the metal tube or die having the desired final shape, Fig. 4 is a longitudinal view of the expanded thermoplastic form or mandrel, Fig. 5 is a longitudinal view of the expanded thermoplastic form or mandrel having a mass of thermosetting material therearound, Fig. 6 is a longitudinal view of the finished hollow shape after the expanded thermoplastic form or mandrel has been returned to its original shape of Fig. 1, Fig. 7 is a longitudinal view of the finished hollow shape.

In the practice of this invention it has been found that hollow objects widely differing in shape can be produced by applying a curing substance, such as a thermosetting curing resin, to form or mandrel consisting of a substance which is rigid at normal temperature but which becomes plastic when heated, such as, for example, polyvinyl chloride, which may or may not have been plasticized, cellulose-aceto butyrate, polymethylmethacrylate, and the like. A form or mandrel of this thermoplastic material is made by expanding this material in plastic condition in a mother mold (which may consist of loose parts for easily removing the mold) and cooling it in expanded form to a temperature below the softening point. Thermoplastic materials of this type, when heated and expanded or contracted and cooled in their expanded or contracted from, will assume and hold the shape (and size) to which they have been expanded or contracted. However, when heated again to above their softening temperature, they will return to their original size and shape before said expansion or contraction, and are thus described as having a plastic or elastic memory.

If, for instance, a tube of such material is blown up in this way in a metal tube of large diameter, a so-called "shrink tube" is formed having the special property of reassuming its original diameter when heated to above the softening point.

If such a shrink tube is wrapped with glass fiber or cloth or other reinforcing material and is subsequently covered with polyester resin, after curing of the resin and heating of the whole to above the "shrink" temperature of the shrink tube, the shrink tube will shrink to its original size and can easily be removed from the polyester reinforced tube.

In order to prevent the materials from mutually adhering, a thin intermediate layer of a substance preventing the adhesion, as for instance, wax or the like, can be previously applied to the shrink tube or core in a way known in the art.

On curing a polyester, the material shrinks. If the curing is effected on a rigid core, considerable tensions arise in the tubular body formed, influencing the strength unfavorably. If a shrink tube is used as the core, it is possible to have it shrink during the curing of the polyester, as a result of which no tensions, or substantially no tensions arise in the polyester tube formed.

In addition to polyester resins, objects of other easily curing substances, such as for instance, cold-curing phenolresorcinal resins, epoxy resins, etc. can be produced according to the process of this application.

The phenomenon of a material with an elastic memory has been described previously, e.g. in United States Patent No. 2,533,609, wherein a process is described for the production of objects having minute orifices, e.g. filters, by the use of the elastic memory of substances such as polymers of methyl methacrylate, vinyl chloride, vinyl acetate and interpolymers thereof.

In addition to tubular objects, T-shaped objects, elbows, bottles and many other hollow shaped objects may be formed according to this invention by first forming a mandrel or form of the expanded core material, forming the thermosetting resin or other material around or in said form, and then heating the form to cause it to contract or expand to its original size, and removing the form from the molded object.

The invention is further illustrated by means of the following examples which are given by way of illustration without intending to limit this invention thereto.

Example I

A polyvinylchloride tube 1 (as shown in Fig. 1) of a given diameter is blown up, whilst heating, in a metal tube 5-6 (as shown in Figs. 2 and 3) the inner diameter of which is larger than the outer diameter of the original polyvinylchloride tube by placing a stopper 4 at one end of tube 1 and a second stopper 2 in which a central bore 3 is present to admit hot oil under pressure at the other end of tube 1, and cooled in the blown-up condition. A polyester tube 7 can subsequently be formed around said widened polyvinylchloride tube 1 as a mandrel in the known way by applying glass fiber or other reinforcing material and polyester resin, around said tube. After curing of the polyester resin, the polyvinylchloride tube or mandrel 1 is brought back to its original size by heating so that it can be removed from the cured polyester tube in a simple manner (as shown in Fig. 6).

Example II

A polyvinylchloride cylinder with one closed end is expanded, for example by internal air pressure, whilst heating, in a bottle-shaped two-part metal matrix the smaller inner diameter of which is larger than the outer diameter of the original polyvinylchloride cylinder, and cooled in its expanded condition. A coating of polyester, glass fiber material is applied around the polyvinylchloride bottle form. After the curing of the reinforced polyester resin, the polyvinylchloride cylinder is brought back to its original shape and size by heating and shrinking so that it can easily be removed from the polyester resin bottle.

On the same way a bottle form can be prepared from a tube of polymethylmethacrylate.

Example III

A bent tube of polymethylmethacrylate is blown up in a bent two-part metal mother mold whilst heating and cooled down in this blown-up position. A mantle of epoxy resin-glass fibre is applied in a known way around the polymethylmethacrylate mother mold thus obtained. After curing of the bent epoxy resin-glass fibre tube the polymethylmethacrylate mother mold is brought back to its original shape by heating and removed from the epoxy resin-glass fibre bent mantle, if necessary in the plastic state.

In this process a cellulose-aceto butyrate tube can be used as a substitute for the polyvinylchloride tube.

While certain materials with a plastic memory and certain thermosetting resins, certain reinforcing materials and examples of their use according to this invention have been set forth above, it will be understood that this is to give illustrative examples of the practice of the invention and that various modifications and changes may be made from the illustrations given without departing from the spirit of the invention or the scope of the following claims.

We claim:

1. The method of producing a molded hollow object which comprises producing a form around which said hollow object is to be molded, by heating and expanding a hollow core of thermoplastic material having the property of elastic memory and having a given external diameter at normal temperature to a larger external diameter, and cooling and setting said thermoplastic material in its expanded form, molding said hollow object around said form, heating said form to restore it to its original diameter at normal temperature, and removing said form from said molded hollow object.

2. The method of producing a molded hollow object of a moldable thermosetting resin which comprises producing a form around which said hollow object is to be molded, by heating and expanding a hollow core of thermoplastic material having the property of elastic memory and having a given external diameter at normal temperature to a larger external diameter, and cooling and setting said thermoplastic material in its expanded form, molding said hollow object of moldable thermosetting resin around said form, heating said form to restore it to its original diameter at normal temperature, and removing said form from said molded hollow object.

3. The method of producing a hollow object of a moldable thermosetting resin which comprises producing a form around which said hollow object is to be molded, by heating and expanding hollow core of thermoplastic material having the property of elastic memory and having a given external diameter at normal temperature to a larger external diameter, and cooling and setting said form of thermoplastic material having the property of elastic memory in its expanded form, molding said hollow object of moldable thermosetting resin around said form, heating said form and allowing it to return to its original diameter at normal temperature, and removing said form from said molded hollow object.

4. The method of producing a hollow object of a moldable thermosetting resin which comprises producing a form around which said hollow object is to be molded, by heating and expanding a hollow core of thermoplastic material having the property of elastic memory selected from the group consisting of polyvinyl chloride, polymethyl methacrylate, polyvinyl acetate, cellulose-aceto butyrate, and co-polymers thereof and having a given external diameter and shape at a normal temperature to a larger external diameter and changed shape, cooling and setting said thermoplastic material in its expanded form, molding said hollow object of moldable thermosetting resin around said expanded form, curing said thermosetting resin and heating said form, allowing it to return to its original diameter and shape at a normal temperature, and removing said form from said molded hollow object.

5. Process for the production of hollow objects from thermosetting resinous material on a deformable form which is removed from the hollow object after being brought back to its original size, characterized in that a hollow object of thermosetting resinous material is molded around a form made of a hollow core of thermoplastic material having the property of elastic memory and which is constant in shape at a normal temperature, said form having been previously expanded in a mother mold at a temperature above the softening point of the thermoplastic material and then cooled below the softening point to retain the expanded form, the thermosetting resinous material is cured at elevated temperatures and the form upon being reheated, shrinks to its original unexpanded state so that it is easily removed from the hollow object formed.

6. The method of producing and removing the core from a hollow, molded object which comprises producing a core form having a given external size and shape at a normal temperature from a hollow core of thermoplastic material having the property of elastic memory, heating and expanding said core form beyond its given external diameter at normal temperature, cooling and setting said core form in said expanded condition, molding a hollow object composed of a thermosetting resin around said expanded core form, heating said core form beyond its softening temperature causing said core form to return to its original given external diameter and shape at normal temperature, and removing said core form from said hollow object.

References Cited in the file of this patent

UNITED STATES PATENTS

| | | |
|---|---|---|
| 1,570,915 | Nose | Jan. 26, 1926 |
| 2,027,962 | Currie | Jan. 14, 1936 |
| 2,422,325 | Wheelon | June 17, 1947 |
| 2,533,609 | Nolan et al. | Dec. 12, 1950 |
| 2,685,118 | Hunter | Aug. 3, 1954 |
| 2,739,350 | Lampman | Mar. 27, 1956 |